United States Patent
Roentgen et al.

(10) Patent No.: US 11,067,446 B2
(45) Date of Patent: Jul. 20, 2021

(54) COMPACT SPECTROMETER MODULES

(71) Applicant: ams Sensors Singapore Pte. Ltd., Singapore (SG)

(72) Inventors: Peter Roentgen, Thalwil (CH); Kotaro Ishizaki, Zurich (SG); Camilla Camarri, AuZH (CH); Markus Rossi, Jona (CH); Elisa Parola, Zurich (SG); Bassam Hallal, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/625,612

(22) PCT Filed: Jun. 18, 2018

(86) PCT No.: PCT/SG2018/050298
§ 371 (c)(1),
(2) Date: Dec. 20, 2019

(87) PCT Pub. No.: WO2018/236287
PCT Pub. Date: Dec. 27, 2018

(65) Prior Publication Data
US 2020/0182695 A1 Jun. 11, 2020

Related U.S. Application Data

(60) Provisional application No. 62/523,369, filed on Jun. 22, 2017.

(51) Int. Cl.
*G01J 3/26* (2006.01)
*G01J 3/02* (2006.01)
(Continued)

(52) U.S. Cl.
CPC .............. *G01J 3/26* (2013.01); *G01J 3/0216* (2013.01); *G01J 3/0256* (2013.01);
(Continued)

(58) Field of Classification Search
None
See application file for complete search history.

(56) References Cited

U.S. PATENT DOCUMENTS

2005/0030545 A1  2/2005  Tuschel et al.
2009/0262346 A1*  10/2009  Egloff .................... G01J 3/02
                                                           356/326
(Continued)

FOREIGN PATENT DOCUMENTS

EP        3073233 A1    9/2016
WO        01/06232 A2   1/2001
WO        2016/063284 A2  4/2016

OTHER PUBLICATIONS

International Preliminary Report on Patentability for Application No. PCT/SG2018/050298 dated Dec. 24, 2019 (6 pages).
(Continued)

*Primary Examiner* — Shawn Decenzo
(74) *Attorney, Agent, or Firm* — Michael Best and Friedrich LLP

(57) ABSTRACT

Compact spectrometer modules include an illumination channel and a detection channel. The illumination channel includes an illumination source operable to generate a broad spectrum of electromagnetic radiation. The detection channel includes an illumination detector and a Fabry-Perot component. The Fabry-Perot component is operable to pass a narrow spectrum of wavelengths to the illumination detector. Further, the Fabry-Perot component can be actuatable such that the Fabry-Perot component is operable to pass a plurality of narrow spectrums of wavelengths to the illumination detector.

27 Claims, 5 Drawing Sheets

(51) Int. Cl.
*G01J 3/10* (2006.01)
*G01J 3/28* (2006.01)

(52) U.S. Cl.
CPC ............... *G01J 3/0291* (2013.01); *G01J 3/10* (2013.01); *G01J 3/2803* (2013.01)

(56) References Cited

U.S. PATENT DOCUMENTS

| | | |
|---|---|---|
| 2009/0295910 A1 | 12/2009 | Mir et al. |
| 2012/0236382 A1* | 9/2012 | Puegner ................ G01J 3/0208 359/209.1 |
| 2013/0229646 A1 | 9/2013 | Sakurai |
| 2015/0185081 A1 | 7/2015 | Sang et al. |
| 2016/0116336 A1 | 4/2016 | Zhao et al. |
| 2016/0182765 A1* | 6/2016 | Hirokubo ............. H04N 1/6044 358/1.9 |
| 2017/0292908 A1* | 10/2017 | Wilk ..................... G01J 3/0289 |
| 2018/0120155 A1* | 5/2018 | Rosen ................... G01J 3/0272 |
| 2018/0143073 A1* | 5/2018 | Goldring ............ G01N 21/3563 |
| 2018/0172510 A1* | 6/2018 | Rosen ................... G01J 3/0256 |
| 2018/0172517 A1* | 6/2018 | Grueger ................ G01J 3/0218 |
| 2018/0184972 A1* | 7/2018 | Carmi ................... G01J 3/0256 |
| 2019/0128734 A1* | 5/2019 | Arbore ................. G01J 3/0256 |
| 2019/0285471 A1* | 9/2019 | Milo ..................... G01J 3/0272 |
| 2020/0056939 A1* | 2/2020 | Ishizaki ................ G01J 3/0297 |

OTHER PUBLICATIONS

International Search Report for corresponding International Application No. PCT/SG2018/050298 dated Jun. 18, 2018.

* cited by examiner

COMPACT SPECTROMETER MODULES

CROSS REFERENCE TO RELATED APPLICATIONS

This patent application is the U.S. national stage entry, under 35 U.S.C. § 371, of International Application No. PCT/SG2018/050298, filed Jun. 18, 2018, which claims priority to U.S. Provisional Patent Application No. 62/523,369 filed Jun. 22, 2017, the entire contents of which are hereby incorporated by reference.

FIELD OF THE DISCLOSURE

This disclosure relates to compact spectrometer modules.

BACKGROUND

Spectrometers can measure the physical and chemical properties of matter. Typically, spectrometers are configured to direct a broad-spectrum of electromagnetic radiation onto a sample, and collect a broad-spectrum of electromagnetic radiation reflected from the sample. Spectrometers may raster through a wide-range of wavelengths in either an illumination or detection mode.

For example, a spectrometer may direct an illumination including a broad range of wavelengths onto a sample of matter (an object such as a foodstuff or chemical), and collect light reflected from the sample incrementally (or stepwise) over a range of wavelengths. In this manner, those wavelengths directed to the sample and absorbed by the sample can be determined. Absorbed wavelengths, for example, may correspond to particular vibrational modes of molecules within the sample thereby providing useful data such as the sample's composition.

Spectrometer data of common objects may be particularly useful for a consumer; for example, the purity of a particular foodstuff may be ascertained from such data. However, spectrometers are typically large, power-hungry, expensive, and difficult to operate. Spectrometers with smaller footprints and reduced power demands could be integrated into computationally powerful, portable devices (e.g., smartphones, laptops, and tablets). Such an integration could enable portability, access to significant computational power, and access to cloud-based resources to give a user a particularly useful tool for collecting spectrometer data of any number of objects.

SUMMARY

This disclosure describes spectrometer modules that can have reduced footprints and power consumption compared to state-of-the-art spectrometers. Each spectrometer module includes an illumination channel disposed within a compact housing and a detection channel disposed within the housing adjacent to the illumination channel. The illumination channel includes an illumination source mounted within an illumination cavity delineated by the housing.

Each spectrometer module further includes an illumination optical assembly aligned with the illumination source. The illumination source can be operable to generate an emission. The illumination channel is operable to generate an emission characterized by a field-of-illumination and illumination axis. The detection channel includes an illumination detector mounted within a detection cavity in the housing and can be operable to detect at least a portion of the emission. The detection channel further includes a detection optical assembly aligned with the illumination detector. The detection channel is characterized by a field-of-view and a detection axis. Further, the detection channel includes a Fabry-Perot component mounted between the detection optical assembly and the illumination detector. The Fabry-Perot component also is aligned with the detection optical assembly and the illumination detector. Moreover, the illumination channel can be operable to direct a portion of the emission to an object, and the detection channel can be operable to collect a portion of the emission reflected from the object.

Various implementations include one or more of the following features. For example, some implementations include a spectral filter mounted within a detection channel and aligned with an illumination detector.

Some implementations include, for example, a reflective surface operable to reflect light emitted by an illumination source and direct the reflected light to an object.

Some implementations include, for example, a parabolic illumination cavity.

Some implementations include, for example, an illumination cavity with a plurality of reflective segments.

Some implementations include, for example, an illumination optical assembly with a segmented optical element.

Some implementations include, for example, an optical-assembly mounting component mounted to a housing and aligned to an illumination channel and a detection channel.

Some implementations include, for example, include an optical-assembly mounting component with an illumination through-hole aligned with an illumination channel and a detection through-hole aligned with a detection channel.

Some implementations include, for example, an illumination through-hole and a detection through-hole that are both filled with a spectral filter.

Some implementations include, for example, an illumination optical assembly directly mounted to a spectral filter filled within an illumination through-hole, and the detection assembly is directly mounted to the spectral filter filled within the detection through-hole.

Some implementations include, for example, an illumination through-hole and a detection through-hole that are partially filled with an illumination optical assembly and the detection optical assembly, respectively.

Some implementations include, for example, a spectral filter operable to block wavelengths of light corresponding to the infrared portion of the electromagnetic spectrum.

Some implementations include, for example, a detection angle about a detection axis that is limited to +/−5 degrees.

Some implementations include, for example, an aperture mounted within a detection channel. The aperture can be operable to permit a portion of an emission reflected from an object and collected by the detection channel to be limited to a detection angle about a detection axis.

Some implementations include, for example, an illumination cavity having first and second opposing sides. The first side being adjacent to a detection channel and the second side being disposed on an opposite side of an illumination cavity. In some instances, the reflective surface is disposed on the first side of the illumination cavity.

Some implementations include, for example, an illumination cavity having first and second opposing sides. The first side being adjacent to a detection channel and the second side being disposed on an opposite side of an illumination cavity. In some instances, the reflective surface is disposed on the second side of the illumination cavity.

Some implementations include, for example, an illumination channel characterized by an illumination axis, and an illumination source is characterized by an elongated axis. The illumination source is mounted in an illumination cavity such that the elongate axis is substantially parallel with the illumination axis.

Some implementations include, for example, an illumination channel characterized by an illumination axis, and an illumination source characterized by an elongated axis. The illumination source is mounted in an illumination cavity such that the elongate axis is substantially perpendicular with the illumination axis.

Some implementations include, for example, an illumination channel characterized by an illumination axis and an illumination source characterized by an elongated axis. The illumination source is mounted in an illumination cavity such that the elongate axis is between 20 degrees and 70 degrees relative to the illumination axis.

Some implementations include, for example, an illumination cavity having first and second opposing sides. The first side being adjacent to a detection channel and the second side being disposed on an opposite side of an illumination cavity. In some instances, a reflective surface is disposed on the second side of the illumination cavity.

Some implementations include, for example, an illumination cavity having first and second opposing sides. The first side being adjacent to a detection channel and the second side being disposed on an opposite side of an illumination cavity. In some instances, a reflective surface is disposed on both the first and the second sides of the illumination cavity.

Other aspects, features and advantages will be readily apparent from the accompanying drawings, and appended claims.

DETAILED DESCRIPTION

Figures 1A, 1B:
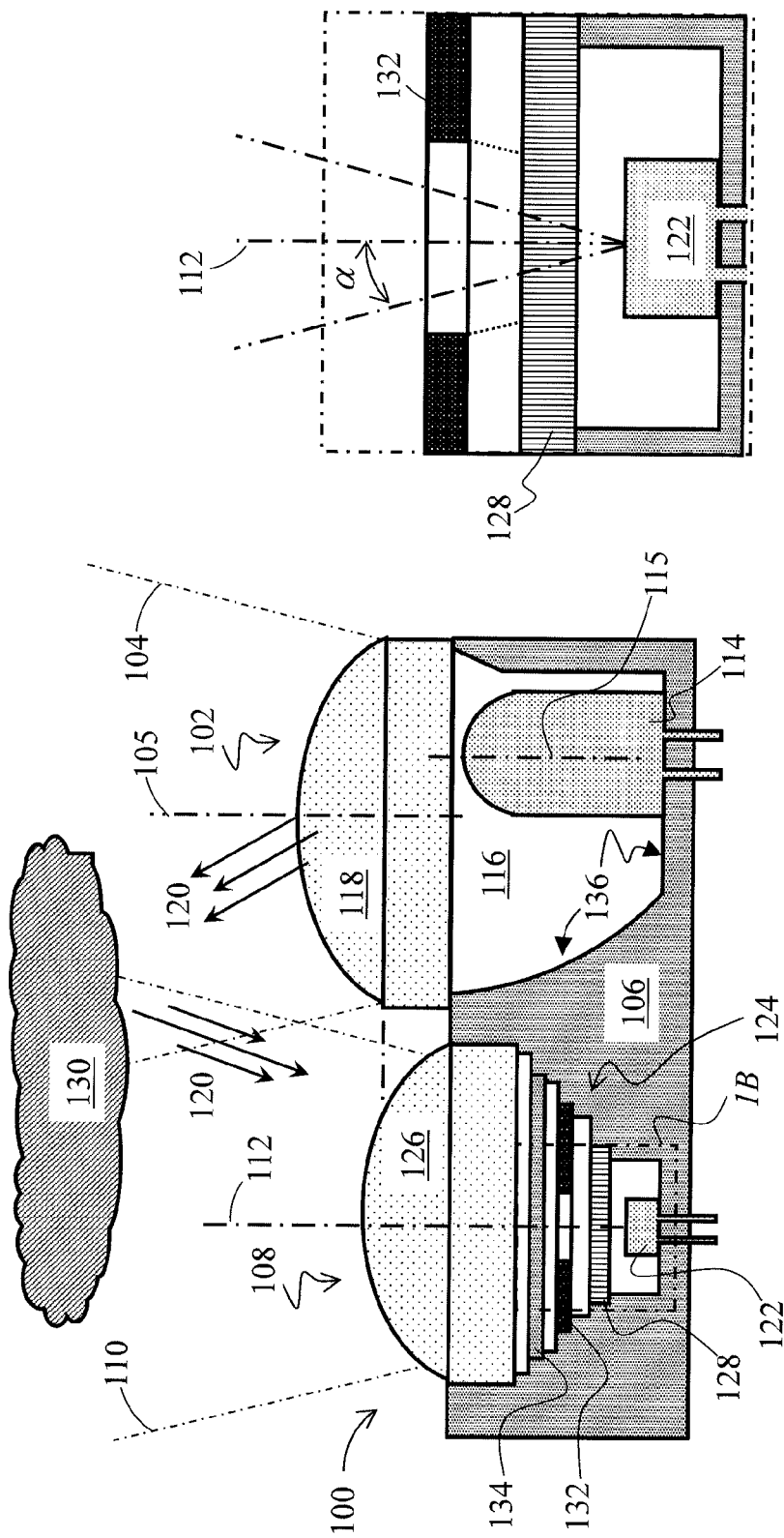
FIG. 1A depicts an example of a spectrometer module.
FIG. 1B depicts a magnified view of a portion of the detection channel of the spectrometer module depicted in FI. 1A.

As shown in FIG. 1A, a spectrometer module 100 includes an illumination channel 102 having a field-of-illumination 104 and a field-of-illumination axis 105 (e.g., a bisector of the field of illumination 104). The illumination channel 102 can be positioned at least partially within a housing 106. The housing 106 can be an injection-molded spacer or a lead-frame encased in a polymer or ceramic, for example. In some instances, the housing can be a printed circuit board (PCB) having holes or through-holes delineating the illumination channel 102.

The spectrometer module 100 further includes a detection channel 108 having a field-of-view 110 and a detection axis 112. The detection channel 108 being positioned at least partially within the housing 106 and adjacent to the illumination channel 102. A portion of the field-of-illumination 104 and the field-of-view 110 overlap. As above, in instances where the housing 106 is a PCB with holes or through-holes, the holes or through-holes can delineate the detection channel 108.

The illumination channel 102 includes an illumination source 114 characterized by an elongated axis 115. Although the illumination source 114 includes an elongated axis in the example implementations depicted in FIG. 1A-FIG. 5B, the illumination source 114 need not include an elongated axis 115. The illumination source can be substantially spherical or cubic, for example.

In the example implementation depicted in FIG. 1A and FIG. 1B, the illumination source 114 is mounted within an illumination cavity 116 such that the elongated axis 115 is substantially parallel to the illumination axis 105. In some instances, the illumination source 114 can be offset from the center of the illumination cavity 116 (described in greater detail below).

The illumination cavity 116 is delineated by the housing 106. For example, the illumination cavity 116 can be a hole or through-hole within the housing 106. The illumination cavity 116 can be characterized by myriad geometric forms or shapes, such as truncated cones, rectangular shapes, cylinders, or parabolas.

The illumination channel 102 further includes an illumination optical assembly 118 aligned with the illumination source 114. The optical assembly 118 can include any number of refractive and/or diffractive lenses. In some instances, the optical assembly 118 may include spectral filters. The spectral filter can be operable to block wavelengths of light corresponding to the infrared portion of the electromagnetic spectrum, for example. In some instances, the optical assembly 118 can include micro-lens arrays or segmented optical elements (e.g., segmented refractive lenses).

The illumination source 114 is operable to generate an emission 120. The illumination source 114 can be operable to emit a broad spectrum of wavelengths. For example, the emission 120 may include wavelengths extending through the visible and infrared portions of the electromagnetic spectrum. In some instances, the illumination source 114 can include an array of semiconductors operable to emit a broad spectrum of wavelengths. In some instances, the illumination source 114 can include an array of laser diodes or light-emitting diodes operable to emit a broad spectrum of wavelengths. In some instances, the illumination source 114 can include a phosphor or a plurality of phosphors that; in conjunction with an array of semiconductors, laser didoes, or light-emitting diodes; can be operable to emit a broad spectrum of wavelengths. Alignment may be determined, in some instances, as the arrangement of the illuminate source 114 and the illumination optical assembly 118 producing the most efficient emission 120.

The detection channel 108 includes an illumination detector 122 mounted within a detection cavity 124 in the housing 106. In some instances, the detection cavity 124 is delineated by holes or through-holes within the housing 106. The illumination detector 122 can be a photodiode, an array of photodiodes, a complementary metal-oxide semiconductor sensor array, a charge-couple device, or an array of charge-couple devices. The illumination detector 122 is operable to detect a broad spectrum of wavelengths and therefore operable to detect at least a portion of the emission 120.

The detection channel 108 further includes a detection optical assembly 126 aligned with the illumination detector 122. The detection optical assembly 126 can include any number of refractive and/or diffractive lenses. In some instances, the detection optical assembly 126 may include spectral filters. In some instances, the detection optical assembly 126 can include microlens arrays or segmented optical elements (e.g., segmented refractive lenses).

The detection channel 108 further includes a Fabry-Perot component 128 mounted between the detection optical assembly 126 and the illumination detector 122 and aligned with the detection optical assembly 126 and the illumination detector 122. The Fabry-Perot component 128 is operable to pass a narrow spectrum of wavelengths to the illumination detector. The Fabry-Perot component 128 can include micro-electro-mechanical systems-based devices or piezoelectric actuators, for example, such that the component is actuatable and can pass a narrow spectrum of wavelengths to the illumination detector.

The illumination channel 102 is operable to direct the emission 120 to an object 130 and the detection channel 108 is operable to collect a portion of the emission 120 reflected from the object 130 in part due to the overlap of the field-of-view and field-of-illumination. In some instances, the illumination optical assembly 118 may be operable to direct the field-of-view 104 toward the detection channel 108 such that light reflected from the object 130 is incident on the detection channel 108 with lower angles of incidence. Alignment may be determined, in some instances, as the arrangement of the illumination detector 122 and the detection optical assembly 126 that collects the most light reflected from the object 130.

In some instances, the detection channel 108 may include an aperture 132 mounted, formed, or deposited within the detection channel 108. The aperture 132 can be operable to permit the portion of the emission 120 reflected from the object 130 and collected by the detection channel 108 to be limited to a detection angle α about the detection axis 112 as depicted in FIG. 1B. For example, the detection angle α about the detection axis 112 can be limited to +/− five degrees. The detection angle α, in conjunction with the Fabry-Perot component 128, and other components within the spectrometer module 100 can establish the range of wavelengths incident on the illumination detector 122, thereby establishing, at least in part, spectral resolution of the spectrometer module 100. The spectral resolution, may depend on the intended application of the spectrometer module 100; accordingly, the detection angle α of +/− five degrees is an example only. Other detections angles α can be used in some implementations.

In some instances, the detection channel 108 may include a spectral filter 134 mounted within the detection channel 108 and aligned with the illumination detector 122.

In some instances, the illumination cavity 102 includes a reflective surface 136 operable to reflect light emitted by the illumination source and being further operable to direct a substantial portion of the reflected light to the object 130. The reflective surface 136 can help prevent cross talk between the illumination cavity 116 and the detection cavity 124. In some instance, the illumination cavity 102 is parabolic and is operable to reflect light to the illumination optical assembly 118 and/or directly to the object 130. In some instance, light may be reflected back to the illumination source 114 wherein the reflected light may stimulate emission of more light (e.g., of different wavelengths than the reflected light, such as longer wavelength light). Moreover, in some instances, the illumination source 114 may be offset from the center of the optical cavity 116. The offset may permit a significant portion of the emission 120 to be directed to the target 130 such that a significant portion of the light incident on the Fabry-Perot component 128 is within the detection α angle (as described above). Accordingly, the emission 120 may be collected by the illumination detector 122 more efficiently, thereby permitting significant power-savings in some cases.

In some implementations, the illumination cavity 116 includes first and second opposing sides. The first side is adjacent to the detection channel 108 and the second side is disposed on an opposite side of the illumination cavity 116. In some instances, such as the implementation depicted in FIG. 1A and FIG. 1B, the reflective surface 136 is disposed on the first side of the illumination cavity 116. In some implementations, the first and second sides are not opposing. For example, the first and second sides could be adjacent to each other.

Figure 2:
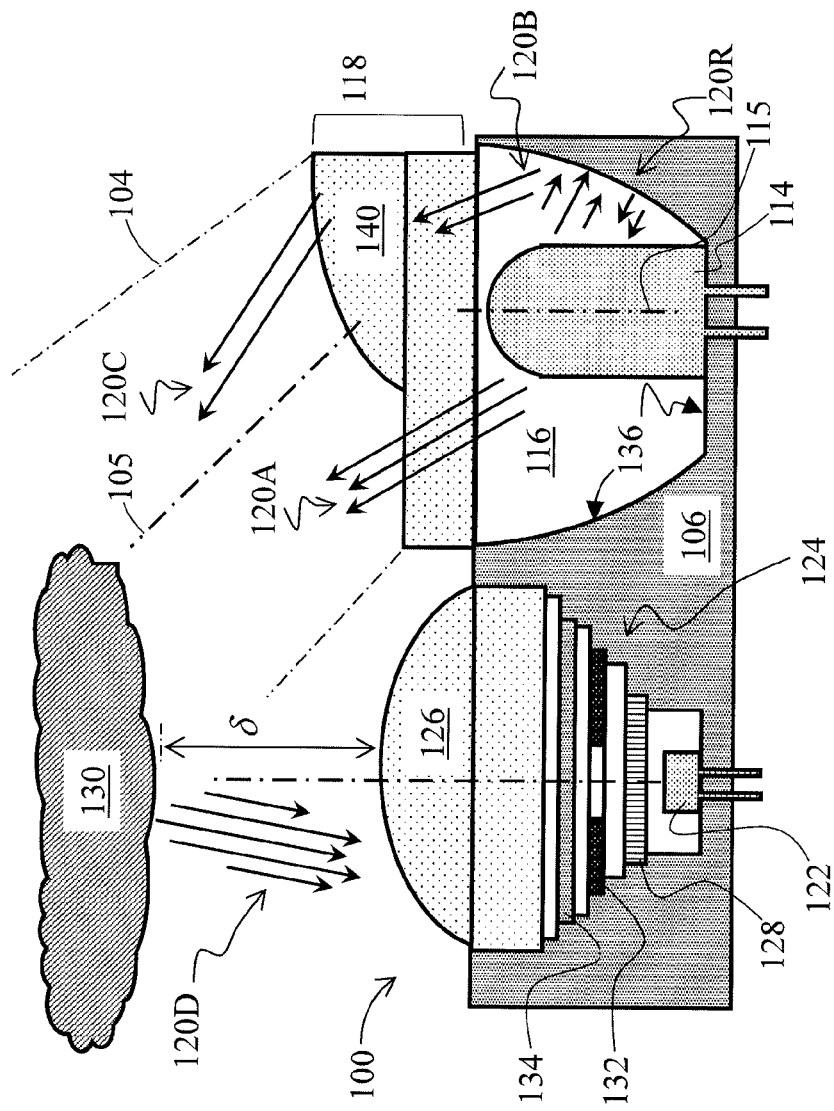
FIG. 2 depicts another example of a spectrometer module that includes an illumination assembly with a segmented optical element.

FIG. 2 depicts another example implementation of the spectrometer module 100. The spectrometer module 100 further includes a segmented optical element 140. In some instances, the illumination optical assembly 118 may be operable to direct the field-of-illumination 104 and the field-of-illumination axis 105 toward the detection channel 108 such that light reflected from the object 130 is incident on the detection channel 108 with lower angles of incidence. In some instances, the segmented optical element 140 can direct the field-of-view 104 as described above.

In some instance, the emission 120 is directly incident on the object 130 as illustrated by emission component 120A in FIG. 2. In some instance, the emission 120 is reflected from the surface of the illumination cavity 116 and directed to the illumination optical assembly 118 as illustrated by emission component 120B in FIG. 2.

In some instances, such as the implementation depicted in FIG. 2, the reflective surface 136 is disposed on both the first and second sides of the illumination cavity 116. Such configurations can improve the efficiency of the spectrometer module 100 thereby reducing power consumption compared to state-of-the-art spectrometers.

In the example implementation depicted in FIG. 2, portions of the emission 120 incident on the optical assembly 118 are directed to the object 130 as illustrated by component 120C. Portions of the emission incident on and reflected from the object 130 are directed to the detection channel 108 as illustrated by component 120D. In some instance, the emission 120 can reflect from the surface of the cavity 102 back to the illumination source 114. The reflected light may stimulate emission of more light (e.g., of different wavelengths than the reflected light). In some instances, the optical assembly 118 is operable to direct a significant portion of the emission 120 to the target such that a significant portion of the light incident on the Fabry-Perot component 128 is within the detection α angle. Accordingly, the emission 120 may be collected by the illumination detector 122 more efficiently, thereby permitting significant power-savings in some cases.

Figure 3:
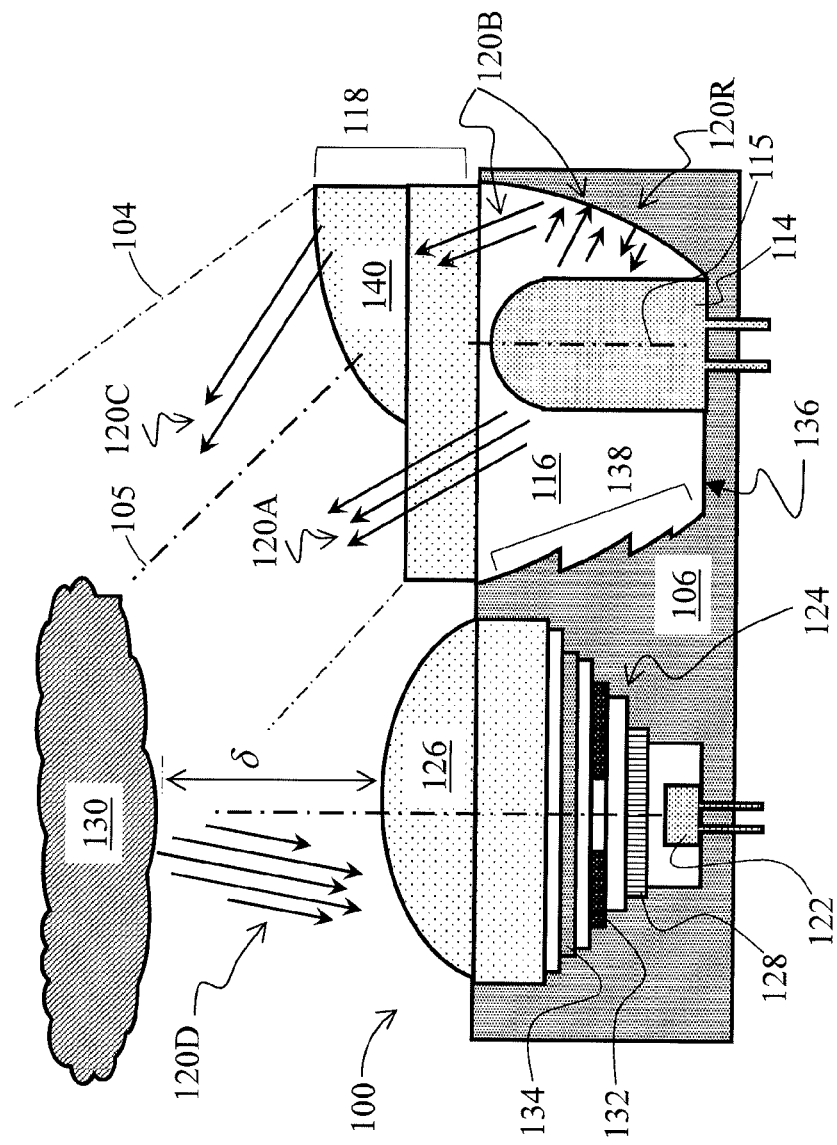
FIG. 3 depicts yet another example of a spectrometer module that includes an illumination cavity with a plurality of reflective segments.

FIG. 3 depicts yet another example implementation of the spectrometer module 100. The spectrometer module 100 includes an illumination cavity 102 with a plurality of reflective segments 138. The plurality of reflective segments 138 can be operable to direct the emission 120 to the illumination optical assembly 118, other portions of the illumination cavity 102, directly to the object 130, and/or back to the light source 114.

FIG. 4 depicts still yet another example implementation of the spectrometer module 100. The spectrometer module 100 further includes an optical-assembly mounting component 142, the optical-assembly mounting component 142 being mounted to the housing 106 and aligned to the illumination channel 102 and the detection channel 108. The optical-assembly mounted component can be a PCB, for example. In some instances, the optical-assembly mounting component 142 includes an illumination through-hole 144 aligned with the illumination channel 102 and a detection through-hole 146 aligned with the detection channel 108. In some instances, the illumination through-hole 144 and the detection through-hole 146 are filled with a spectral filter 148. In some instances, the illumination optical assembly 118 is directly mounted to the spectral filter 148 filled within the illumination through-hole 144, and the detection optical assembly 126 is directly mounted to the spectral filter 148 filled within the detection through-hole 146. In some instances, the illumination through-hole 144 and the detection through-hole 146 are partially filled with the illumination optical assembly 118 and the detection optical assembly 126, respectively.

Figure 4B:
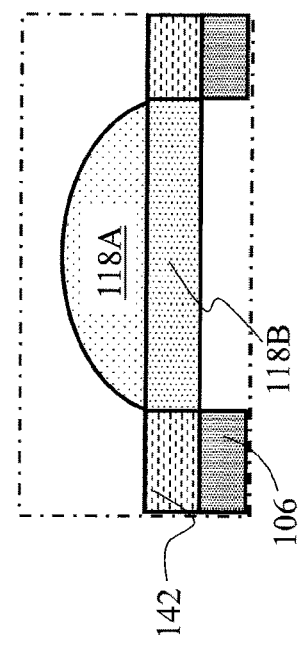
FIG. 4B and FIG. 4C depict magnified views of alternative arrangements of the optical-assembly mounting component depicted in FIG. 4A.
Figure 4C:
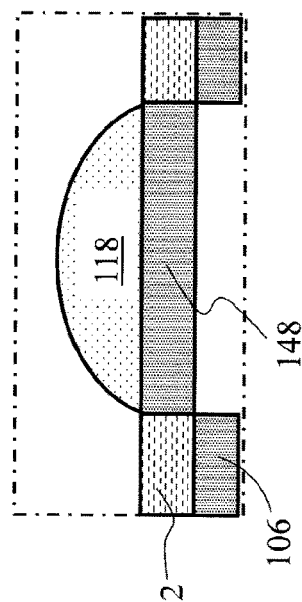
Figure 4A:
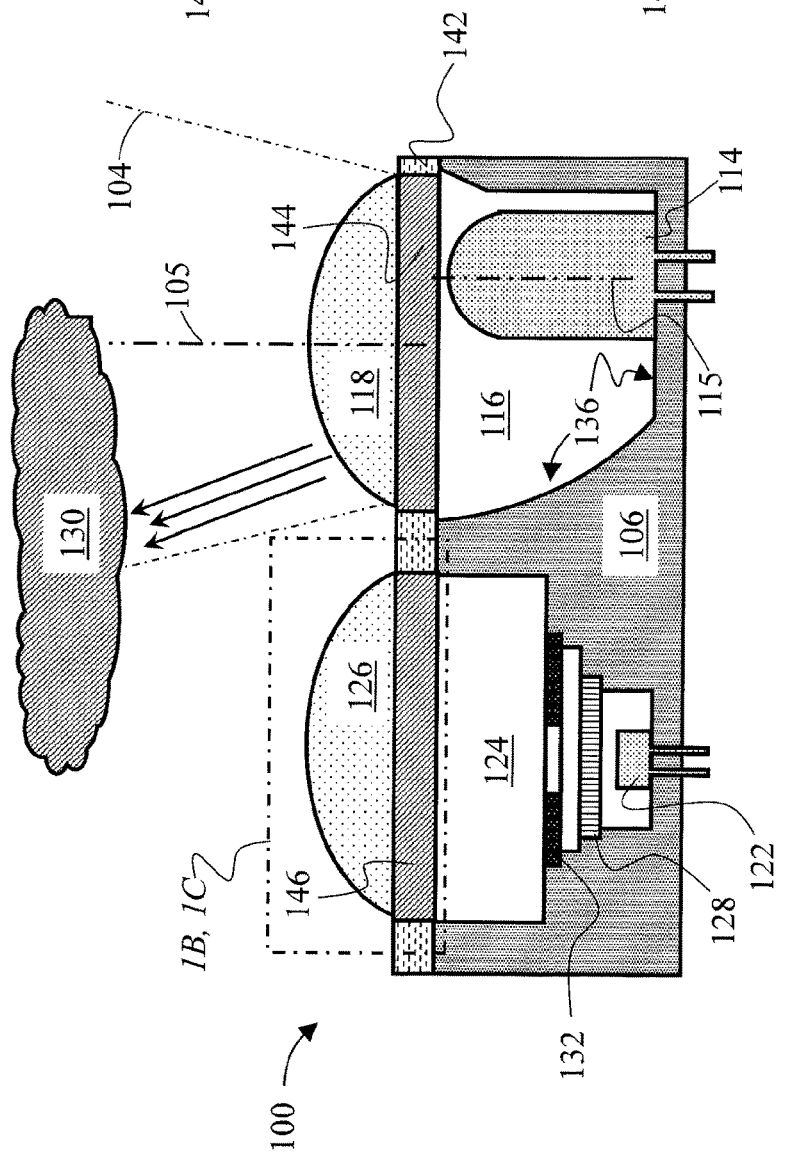
FIG. 4A depicts still yet another example of a spectrometer module that includes an optical-assembly mounting component.

FIG. 4B and FIG. 4C depict magnified views of alternative arrangements of the optical-assembly mounting component depicted in FIG. 4A and described above. A portion of the illumination optical assembly within the illumination through-hole 144 is illustrated as component 118B. A portion of the illumination optical assembly mounted above the illumination through-hole 144 is illustrated as component 118A.

Figure 5A:
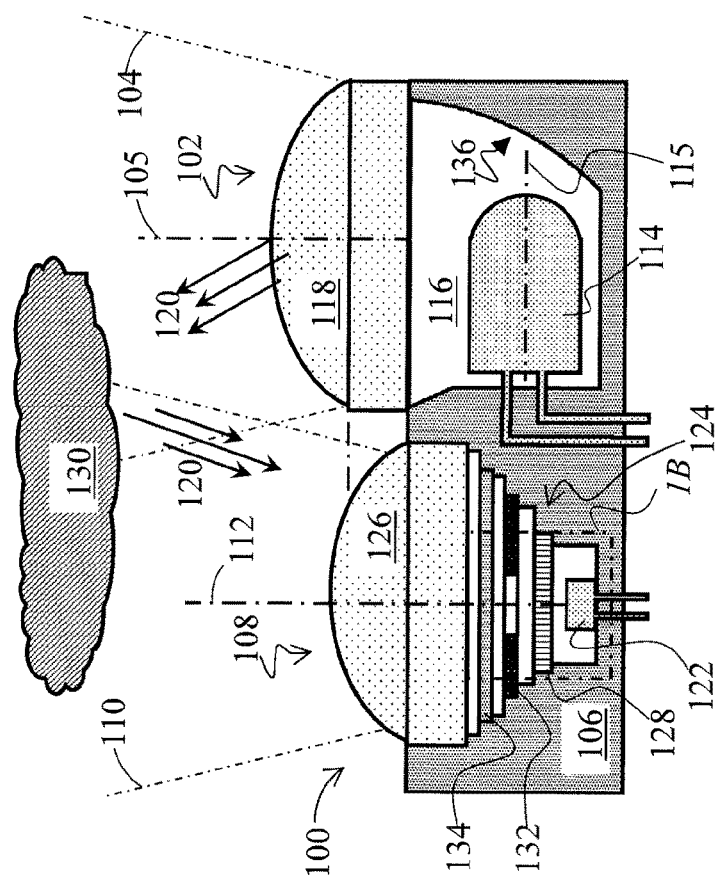
FIG. 5A depicts an example of a spectrometer module.

FIG. 5A depicts still yet another example implementation of the spectrometer module 100. In this implementation, the illumination source 114 is mounted within the illumination cavity 116 such that the elongated axis 115 is substantially perpendicular to the illumination axis 105. This implementation is characterized by a smaller module height.

Figure 5B:
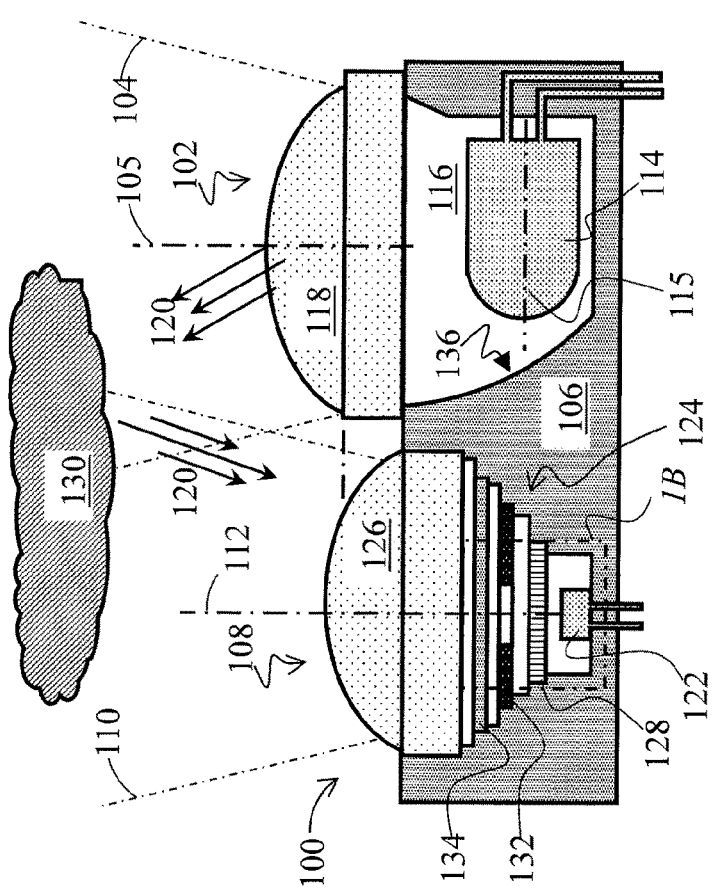
FIG. 5B depicts still another example of a spectrometer module.

FIG. 5B depicts still yet another example implementation of the spectrometer module 100. In this implementation, the illumination source 114 is mounted within the illumination cavity 116 such that the elongated axis 115 is substantially perpendicular to the illumination axis 105 as in FIG. 5A. In some instances, such as the implementation depicted in FIG. 5B, the reflective surface 136 is disposed on the second side of the illumination cavity 116. Such configurations can improve the efficiency of the spectrometer module 100 while minimizing the footprint of the spectrometer module 100.

Various modifications may be made to the foregoing implementations, and features described above in different implementations may be combined in the same implementation. Thus, other implementations are within the scope of the claims.

What is claimed is:

1. A spectrometer module comprising:
    an illumination channel with a field-of-illumination, the illumination channel being positioned at least partially within a housing; and
    a detection channel with a field-of-view and a detection axis, the detection channel being positioned at least partially within the housing and adjacent to the illumination channel;
    the illumination channel including an illumination source mounted within an illumination cavity in the housing and an illumination optical assembly aligned with the illumination source, the illumination source being operable to generate an emission;
    the detection channel including an illumination detector mounted within a detection cavity in the housing and being operable to detect at least a portion of the emission;
    the detection channel further including a detection optical assembly aligned with the illumination detector, and a Fabry-Perot component mounted between the detection optical assembly and the illumination detector and aligned with the detection optical assembly and the illumination detector; and
    the illumination channel being operable to direct a portion of the emission to an object and the detection channel being operable to collect a portion of the emission reflected from the object,
    wherein the illumination optical assembly includes a segmented refractive lens operable to direct the field-of-illumination toward the detection channel.

2. The spectrometer module of claim 1 further comprising an aperture mounted within the detection channel, the aperture being operable to permit the portion of the emission reflected from the object and collected by the detection channel to be limited to a detection angle about the detection axis.

3. The spectrometer of claim 2, wherein the detection angle about the detection axis is limited to +/−5 degrees.

4. The spectrometer module of claim 1 further comprising a spectral filter mounted within the detection channel and aligned with the illumination detector.

5. The spectrometer of claim 4, wherein the spectral filter is operable to block wavelengths of light corresponding to the infrared portion of the electromagnetic spectrum.

6. The spectrometer module of claim 1, wherein the illumination cavity includes a reflective surface operable to reflect light emitted by the illumination source and direct the reflected light to the object.

7. The spectrometer module of claim 6, wherein the illumination cavity is parabolic.

8. The spectrometer module of claim 6, wherein the illumination cavity includes a plurality of reflective segments.

9. The spectrometer module of claim 6, wherein the illumination cavity includes first and second opposing sides, the first side being adjacent to the detection channel, the second side disposed on an opposite side of the illumination cavity, and the reflective surface disposed on the first side of the illumination cavity.

10. The spectrometer module of claim 6, wherein the illumination cavity includes first and second opposing sides, the first side being adjacent to the detection channel, the second side disposed on an opposite side of the illumination cavity, and the reflective surface disposed on the second side of the illumination cavity.

11. The spectrometer module of claim 10, wherein the illumination channel has an illumination axis and the illumination source has an elongated axis, the illumination source being mounted in the illumination cavity such that the elongated axis is substantially perpendicular with the illumination axis.

12. The spectrometer module of claim 6, wherein the illumination cavity includes first and second opposing sides, the first side being adjacent to the detection channel, the second side disposed on an opposite side of the illumination cavity, and the reflective surface disposed on both the first and the second sides of the illumination cavity.

13. The spectrometer module of claim 1 further comprising an optical-assembly mounting component mounted to the housing and aligned to the illumination channel and the detection channel.

14. The spectrometer module of claim 13, wherein the optical-assembly mounting component includes an illumination through-hole aligned with the illumination channel and a detection through-hole aligned with the detection channel.

15. The spectrometer module of claim 14, wherein the illumination through-hole and the detection through-hole are filled with a spectral filter.

16. The spectrometer module of claim 15, wherein the illumination optical assembly is directly mounted to the spectral filter filled within the illumination through-hole, and the detection assembly is directly mounted to the spectral filter filled within the detection through-hole.

17. The spectrometer module of claim 14, wherein the illumination through-hole and the detection through-hole are partially filled with the illumination optical assembly and the detection optical assembly, respectively.

18. The spectrometer module of claim 1, wherein the illumination channel has an illumination axis and the illumination source has an elongated axis, the illumination source being mounted in the illumination cavity such that the elongated axis is substantially parallel with the illumination axis.

19. The spectrometer module of claim 1, wherein the illumination channel has an illumination axis and the illumination source has an elongated axis, the illumination source being mounted in the illumination cavity such that the elongated axis is substantially perpendicular with the illumination axis.

20. The spectrometer module of claim 1, wherein the illumination channel has an illumination axis and the illumination source has an elongated axis, the illumination source being mounted in the illumination cavity such that the elongate axis is between 20 degrees and 70 degrees relative to the illumination axis.

21. The spectrometer module of claim 1, wherein the illumination source is operable to emit a broad spectrum of wavelengths.

22. The spectrometer module of claim 1, wherein the illumination detector is operable to detect a broad spectrum of wavelengths.

23. The spectrometer module of claim 1, wherein the Fabry-Perot component is operable to pass a narrow spectrum of wavelengths to the illumination detector.

24. The spectrometer module of claim 23, wherein the Fabry-Perot component is actuatable such that the Fabry-Perot component is operable to pass a plurality of different narrow spectrums of wavelengths to the illumination detector.

25. The spectrometer module of claim 1, wherein the illumination source includes an array of semiconductors operable to emit a broad spectrum of wavelengths.

26. The spectrometer module of claim 1, wherein the illumination detector includes a photodiode, an array of photodiodes, a complementary metal-oxide semiconductor sensor array, a charge-couple device, or an array of charge-couple devices.

27. The spectrometer module of claim 1, wherein the illumination source is offset from a center of the illumination cavity.

* * * * *